(No Model.)

W. W. KING & F. M. DUNN.
NUT LOCK.

No. 514,623.          Patented Feb. 13, 1894.

Witnesses

Inventors:
William W. King
Francis M. Dunn
By their Attorneys

THE NATIONAL LITHOGRAPHING COMPANY,
WASHINGTON, D. C.

UNITED STATES PATENT OFFICE.

WILLIAM WILEY KING AND FRANCIS MARION DUNN, OF WELLMAN, MISSISSIPPI.

NUT-LOCK.

SPECIFICATION forming part of Letters Patent No. 514,623, dated February 13, 1894.

Application filed April 21, 1893. Serial No. 471,314. (No model.)

*To all whom it may concern:*

Be it known that we, WILLIAM WILEY KING and FRANCIS MARION DUNN, citizens of the United States, residing at Wellman, in the county of Lincoln and State of Mississippi, have invented certain new and useful Improvements in Nut-Locks; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention has reference to new and novel improvements in nut locks designed especially to be employed in connection with the bolts and nuts for securing the meeting ends of railroad rails, and has for its object to provide a lock which will operate automatically to prevent the nut from becoming detached when the same is screwed in place, and which will readily permit the removal of the nut when desired without in any way impairing the parts.

Our invention consists essentially in a bolt having a lengthwise depression which receives a latch, the outer end of which engages the nut when the latter is in place; and the inner end being so formed that pressure being applied by the nut, the latch is rendered self-locking.

The construction, relative arrangement and operation of the several parts of our improved nut lock will now be particularly described, and reference is to be had in connection with such description to the accompanying drawings which form a part thereof, and in which—

Figure 1:
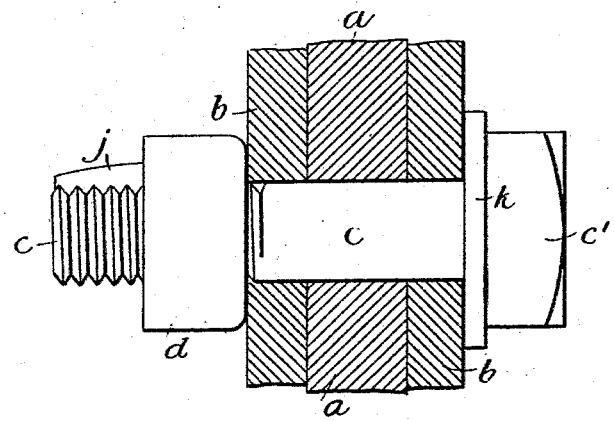
Figure 2:
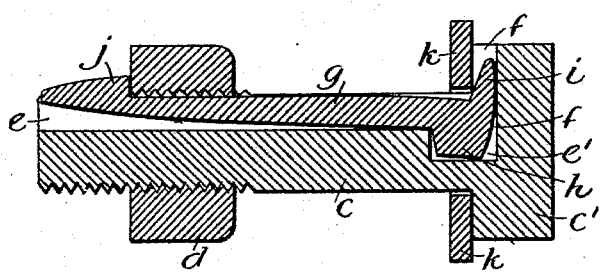
Figure 3:
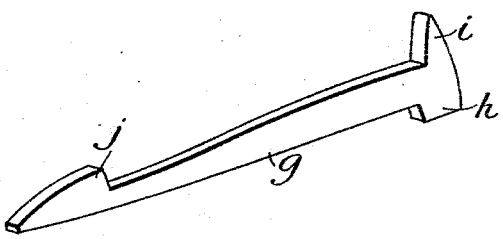

Figure 1, illustrates in elevation our improved nut lock in position; Fig. 2, a longitudinal section thereof and Fig. 3, a perspective view of the latch employed in connection with the bolt and nut.

The reference letter $a$ denotes the rail and $b$ $b$ are the fish plates between which the rail is confined. The rail and fish plates are perforated to receive the bolt $c$ which is provided at one end with a square or other shaped head $c'$, and is exteriorly screw-threaded to receive the nut $d$. Lengthwise of the bolt is a groove $e$ which is arranged centrally and in line with a groove $f$ formed on the inner side of the head and at the junction of these two grooves is a depression $e'$ which forms a continuation of the groove $e$.

The latch for locking the nut is shown at $g$ and is adapted to be seated in the groove $e$ which is of sufficient depth to receive it. On the inner lower end of the latch is a projection $h$ which fits within the depression $e'$ when the latch is in place, and extending above this inner end is a finger $i$, the outer side of which is inclined and fits partly within the groove $f$ in the head of the bolt. On the outer end of the latch is a hook $j$ which is normally entirely within the groove to permit of the attachment of the nut. The outer side of the finger projects sufficiently beyond the inner face of the head $c'$ to permit of its engagement with the surface of the fish plate, or an interposed washer $k$.

In operation the bolt is passed through the rail and fish plates, the finger being in contact with the washer $k$. The nut is then screwed on and passes over the hook $j$, and pressure being applied by the nut, the finger is moved by its contact with the washer entirely within the groove in the head of the nut. The inward movement of the finger operates through the fulcrum at $h$ to raise the outer hooked end of the latch to engage the outer face of the nut and prevent its accidental removal. When it is desired to disconnect the nut the hook may be forced downward sufficiently to permit the nut to pass over it. One or more washers may be employed according to the width of the rail and fish plates, or if desired the head of the bolt or the nut may contact directly with the plates.

What we claim as our invention is—

1. A nut lock comprising in combination a grooved bolt, a nut, a latch adapted to fit said groove having at its inner end a finger for contact with the body or an interposed washer, and having at its outer end a shoulder adapted to be depressed by the nut and to be raised by the finger after the nut is in place, substantially as set forth.

2. A nut lock comprising in combination the bolt having the groove e, the head having the groove f, the depression e' at the inner end of the groove, the nut, and the spring latch having the finger i for the groove f, projection h for the depression, and the hook j at the outer end, substantially as and for the purposes set forth.

In testimony whereof we affix our signatures in presence of two witnesses.

WILLIAM WILEY KING.
FRANCIS MARION DUNN.

Witnesses:
A. M. McMILLAN,
WESLEY HAYNES.